UNITED STATES PATENT OFFICE.

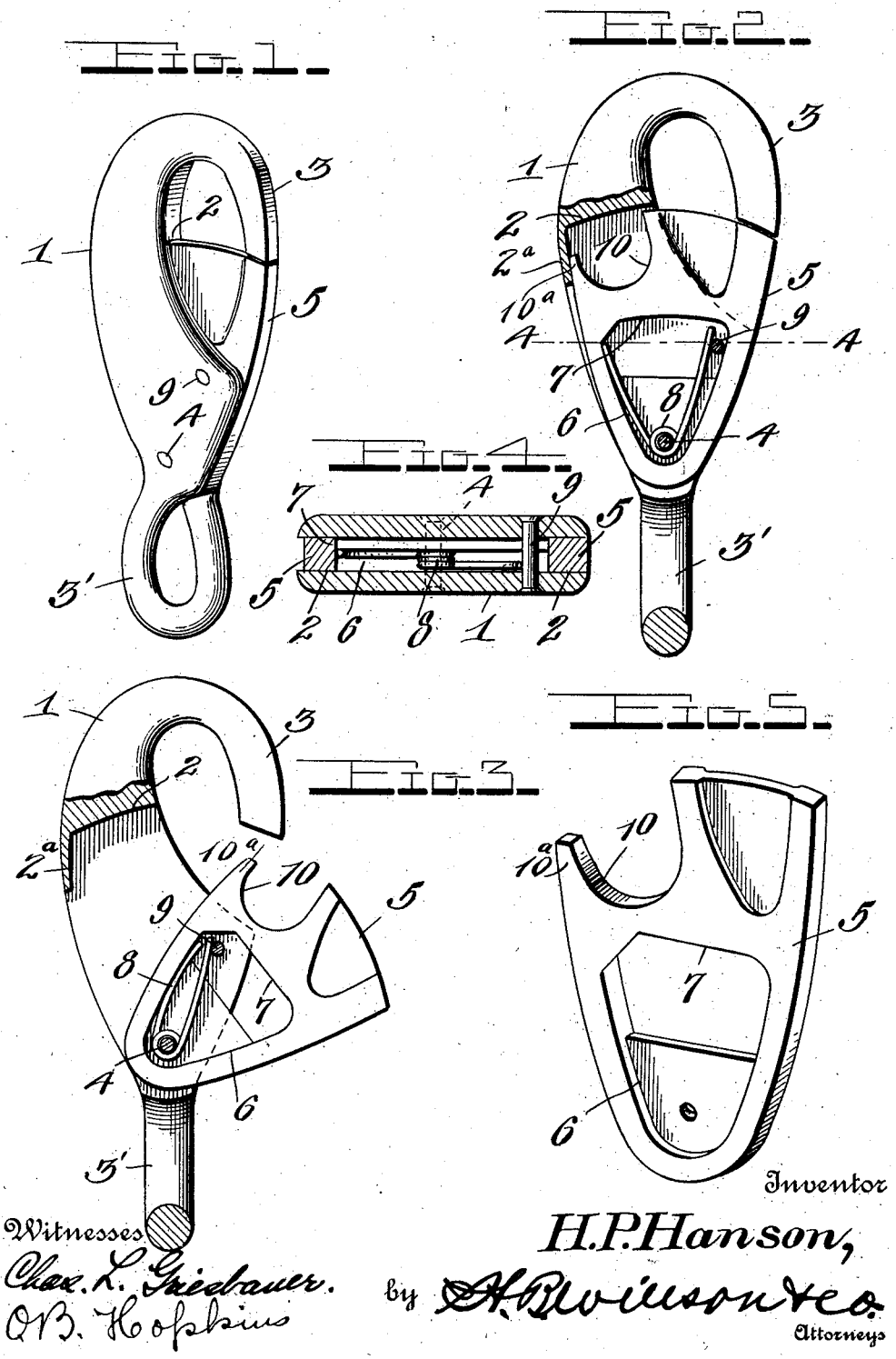
H. P. HANSON.
SAFETY SNAP HOOK.
APPLICATION FILED JAN. 30, 1911.
1,022,940.
Patented Apr. 9, 1912.
Inventor
H. P. Hanson,

HAAKEN P. HANSON, OF ALBERT LEA, MINNESOTA.

SAFETY SNAP-HOOK.

1,022,940.  Specification of Letters Patent.  Patented Apr. 9, 1912.

Application filed January 30, 1911. Serial No. 605,509.

*To all whom it may concern:*

Be it known that I, HAAKEN P. HANSON, a citizen of the United States, residing at Albert Lea, in the county of Freeborn and State of Minnesota, have invented certain new and useful Improvements in Safety Snap-Hooks; and I do declare the following to be a full, clear, and exact description of the invention, such as will enable others skilled in the art to which it appertains to make and use the same.

This invention relates to improvements in snap hooks or the like.

One object of the invention is to provide a hook of this character having an improved construction and arrangement of guard or dog by means of which a ring or other object with which the bill of the hook is engaged will be positively prevented from becoming casually disengaged from the hook and in which the dog or guard is adapted to be opened outwardly.

Another object is to provide a snap hook which will be simple, strong, durable and inexpensive in construction, and efficient and reliable in operation.

With these and other objects in view, the invention consists of certain novel features of construction, combination and arrangement of parts as will be more fully described and particularly pointed out in the appended claim.

In the accompanying drawings: Figure 1 is a perspective view of a snap hook constructed in accordance with my invention; Fig. 2 is a side view with parts broken away and in section showing the construction and arrangement of the guard or dog of the hook; Fig. 3 is a similar view showing the dog or guard in open position; Fig. 4 is a transverse sectional view on the line 4—4 of Fig. 2; Fig. 5 is a detail perspective view of the guard or dog of the hook.

Referring more particularly to the drawings, 1 denotes the body portion of the hook having therein a slot or recess 2. On the outer end of the body portion 1 is formed the inwardly curved bill 3 of the hook. On the inner end of the body portion 1 is formed an eye 3' by means of which the hook is attached to a chain, strap or other device.

Pivotally mounted on a transverse pivot pin 4 in the recess 2 and adapted to swing outwardly therefrom is a dog 5 which when in its normal position engages the end of the bill and closes the lower end of the space between the bill and the body of the hook. The dog 5 has formed in its lower portion a recess 6 and opening 7. In the recess is arranged a dog retracting spring 8 having in its looped end a coil forming an eye which engages the pivot pin 4 of the dog. One end of the spring 8 is engaged with one wall of the recess 6 and opening 7 while the other end engages a transverse stop pin 9 arranged in the body of the hook and which projects through the opening 7 in the dog as shown. The pin 9 also serves as a stop to limit the outward swinging movement of the dog. The spring when thus arranged will close the dog and yieldingly hold the same in closed position so that the dog must be gripped and swung outwardly to an open position when desired.

In the upper end of the dog or guard 5 near its inner edge is formed a notch 10 which when the dog is swung partly open forms a continuation of the space between the bill and body of the hook and is adapted to receive the ring or other object with which the hook is engaged. When the ring or other object is thus engaged with the notch 10 the opening movement of the dog is continued until the notch and ring therein clears the bill of the hook as shown in Fig. 3 of the drawing thereby releasing the ring and permitting the same to be removed from the hook.

As clearly shown the ring receiving notch 10 is formed by the upper curved portion of the dog 5, and its rear extension $10^a$ is adapted for contact with the rear downwardly projecting wall $2^a$ of the body portion of the snap hook, whereby the said dog is limited in its movement within the confined position of the said body portion. When the dog 5 is in opened position the curved notch 10 will be located beyond the bill 3 of the hook and in a convenient position to primarily receive the link of a chain previous to being passed between the space formed by the end of the bill and the extension $10^a$.

By referring particularly to Fig. 3, it will be seen that the rear extension $10^a$ is shorter than the curved engaging surface of the dog 5 and that when the latter is in an open position the end of the said extension will be located a suitable distance from the end of the bill 3, whereby the desired number of rings or links of a chain may be conveniently positioned in respect to the hook before the dog is released. The dog is opened to release the ring or other object by gripping the outer edge of the dog and swinging the same outwardly on its pivot pin, and when released the dog will be quickly brought to a closed position by the spring 8 as hereinbefore described.

While the invention is herein shown and particularly described as being arranged in the form of a snap hook it is obvious that the same may be arranged in the form of a safety check line hook, whiffletree hook or in any other form or for any other purpose desired.

From the foregoing description, taken in connection with the accompanying drawings, the construction and operation of the invention will be readily understood without requiring a more extended explanation.

Having thus described my invention what I claim is:—

A snap hook comprising a body portion and an overhanging bill, said body having a longitudinal recess in its lower portion and a rear downwardly projecting wall, a dog pivotally secured in said recess and having an upper curved portion adapted to freely move over the end of the bill, an extension forming a part of the dog and adapted for contact with the rear wall of the body portion, said extension being shorter than the curved portion of the dog whereby a link receiving space is formed between the end of the bill and dog when the same is in link receiving position, a receiving notch being formed between the extension and the upper curved portion of the dog, and a spring for holding the dog in a closed position with the notched portion thereof housed within the recess of the body with the extension in contact with the rear wall of said body.

In testimony whereof I have hereunto set my hand in presence of two subscribing witnesses.

HAAKEN P. HANSON.

Witnesses:
A. C. ERICKSON,
A. C. HARTZ.

Copies of this patent may be obtained for five cents each, by addressing the "Commissioner of Patents, Washington, D. C."